United States Patent [19]

Jones

[11] Patent Number: 5,058,251
[45] Date of Patent: Oct. 22, 1991

[54] TWO-STAGE TRANSFER BAR LIFT ARM

[75] Inventor: Joel W. Jones, Windsor, Canada

[73] Assignee: Tri-Way Machine Ltd., Windsor, Canada

[21] Appl. No.: 640,828

[22] Filed: Jan. 14, 1991

[51] Int. Cl.⁵ .............................................. B23Q 7/00
[52] U.S. Cl. ................................................. 29/33 P
[58] Field of Search ............... 29/33 P, 563; 409/219, 409/227; 198/345.1, 345.2, 345.3, 465.2, 465.1, 774.2, 774.1, 774.3, 742, 741

[56] References Cited

U.S. PATENT DOCUMENTS

| 4,669,607 | 6/1987 | Mason | 198/774.3 |
| 4,868,960 | 9/1989 | Takagi | 29/33 P |

FOREIGN PATENT DOCUMENTS

| 2064927 | 7/1971 | Fed. Rep. of Germany | 198/774.2 |
| 28148 | 2/1987 | Japan | 198/774.2 |
| 309883 | 10/1971 | U.S.S.R. | 198/774.2 |
| 963928 | 10/1982 | U.S.S.R. | 198/774.3 |
| 1431983 | 10/1988 | U.S.S.R. | 198/774.3 |

Primary Examiner—William Briggs
Attorney, Agent, or Firm—Shoemaker and Mattare, Ltd.

[57] ABSTRACT

A two-stage lift arm for raising a transfer bar used in a multi-station machining assembly includes a central pivot at which it is mounted for rotation in a vertical plane about a horizontal axis, a primary lift roller spaced a first distance from the central pivot location, a secondary lift roller spaced a second distance from the central pivot location, the second distance being greater than the first distance, and means for positively rotating the lift arm between a first position in which only the primary lift roller contacts the transfer bar, a second position in which both rollers contact the transfer bar, and a third position in which only the second lift roller contacts the transfer bar.

18 Claims, 3 Drawing Sheets

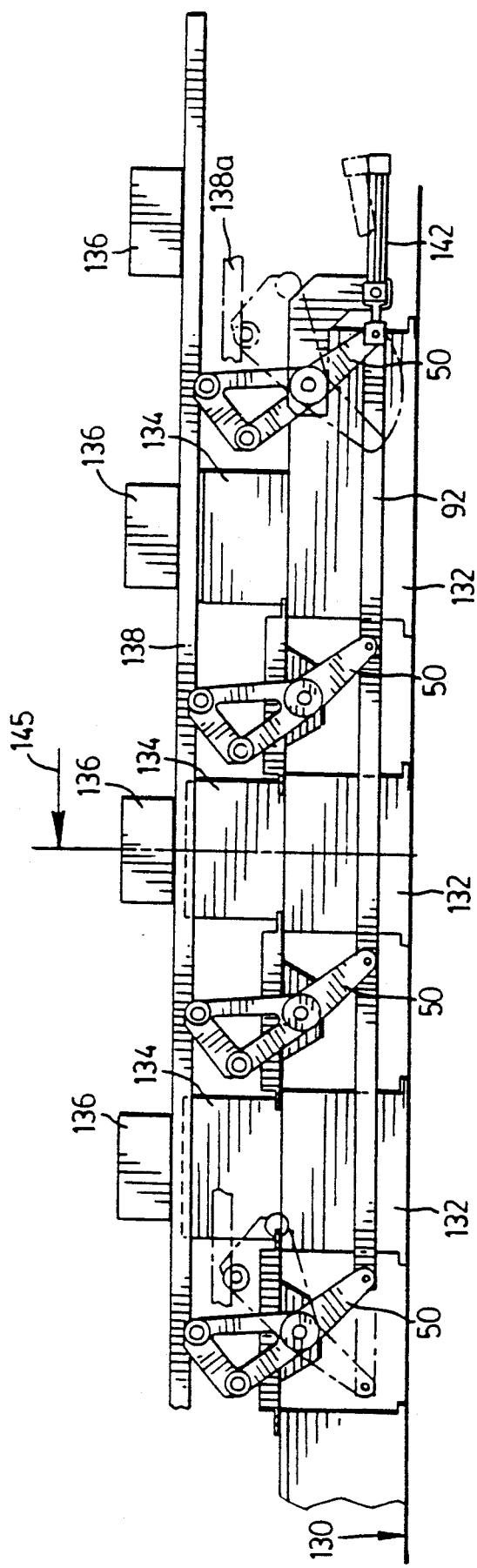

TWO-STAGE TRANSFER BAR LIFT ARM

This invention relates generally to an improved transfer bar lift arm for use with lift and carry transfer machines.

BACKGROUND OF THIS INVENTION

The transfer bar lift arm to which this invention is directed is used in machining operations where there are a number of stations between which a workpiece is cycled in order to receive different machining operations at each station. The workpiece may be moved by itself, or may be secured to a pallet which is moved. In order to move the workpiece between the stations, the workpiece or pallet rides on transfer bars, and the transfer bars (usually two in side-by-side relation) move forward the prescribed distance between operations. The workpiece or pallet is not fixed to the transfer bars, and when the transfer bars finish their motion, the workpiece or pallet is then set down on some sort of locking and holding mechanism (a fixture) which supports the workpiece for the operation. Before the transfer bar moves, however, it must be raised upwardly (to raise the workpiece prior to transportation), and this is typically accomplished by lift arms of the kind to which this invention is directed. A typical distance through which a transfer bar might be raised by the lift arms is about seven inches.

A patent exemplary of the prior art in this area is U.S. 4,868,960, which issued Sep. 26, 1989 to Takagi et al. This patent shows lift arms controlled by an actuation rod for movement between two extreme positions, one corresponding to the lowest position of the transfer bar, the other corresponding to the highest position of the transfer bar.

Other patents of general interest are the following: U.S. Pat. No. 2,039,754, issued May 5, 1936 to J.B. Tiedemann; U.S. Pat. No. 2,193,840, issued Mar. 19, 1940 to A. Oberhoffken et al; U.S. Pat. No. 2,895,354, issued July 21, 1959 to D.E. Hawkinson et al; U.S. Pat. No. 3,010,371, issued Nov. 28, 1961 to K.A. Riedel et al; U.S. Pat. No. 4,394,897, issued July 26, 1983 to J.H. Brems; U.S. Pat. No. 4,603,456, issued Aug. 5, 1986 to M. Hiroyasu et al; U.S. Pat. No. 4,783,889, Nov. 15, 1988 to S. Hayashi.

GENERAL DESCRIPTION OF THE INVENTION

It is desirable to be able to increase the maximum weight capacity of the transfer bar, without changing the hydraulic equipment. It is also desirable to be able to provide a larger vertical lift for the transfer bar, if this appears to be of advantage to the designer.

The achievement of these aims is the object of one aspect of this invention.

More particularly, this invention provides, for use in a multi-station machining assembly in which a workpiece to be machined is transported on at least one transfer bar from one station to another, wherein said at least one transfer bar must be raised to a top position for transportation of the workpiece and lowered to a bottom position when the workpiece reaches a station, the improvement which comprises:

a plurality of two-stage lift arms mounted to raise and lower said at least one transfer bar, each lift arm having a central pivot location at which it is mounted for rotation in a vertical plane about a horizontal axis, a primary lift roller spaced a first distance from said central pivot location, a secondary lift roller spaced a second distance from said central pivot location, the two lift rollers subtending an acute angle at said central pivot location, said second distance being greater than said first distance; and means for positively rotating the lift arms in tandem between (1) a first position in which only the primary lift rollers contact the respective transfer bar with the latter in its bottom position, (2) a second position in which both lift rollers contact the respective transfer bar with the latter in a position intermediate its bottom and top positions, and (3) a third position in which only the second lift rollers contact the respective transfer bar with the latter in its top position.

Further, this invention provides a multi-station machining assembly, comprising:

a plurality of work stations, at least one transfer bar adapted to transfer between work stations a plurality of workpieces, a plurality of two-stage lift arms mounted to raise and lower said at least one transfer bar between a top position for transportation of the workpieces and a bottom position allowing the workpieces to be secured for machining, each lift arm having a central pivot location at which it is mounted for rotation in a vertical plane about a horizontal axis, a primary lift roller spaced a first distance from said central pivot location, a secondary lift roller spaced a second distance from said central pivot location, the two lift rollers subtending an acute angle at said central pivot location, said second distance being greater than said first distance; and means for positively rotating the lift arms in tandem between (1) a first position in which only the primary lift rollers contact the respective transfer bar with the latter in its bottom position, (2) a second position in which both lift rollers contact the respective transfer bar with the latter in a position intermediate its bottom and top positions, and (3) a third position in which only the second lift rollers contact the respective transfer bar with the latter in its top position.

Finally, this invention provides, in a multistation machining process in which a workpiece to be machined is transported on at least one transfer bar from one station to another, wherein said at least one transfer bar is raised to a top position for transportation of the workpiece and lowered to a bottom position when the workpiece reaches a station, a method of raising said at least one transfer bar from the bottom to the top position, the method comprising:

providing a plurality of two-stage lift arms mounted to raise and lower said at least one transfer bar, each lift arm comprising a central pivot location at which it is mounted for rotation in a vertical plane about a horizontal axis, a primary lift roller spaced a first distance form said central pivot location, a secondary lift roller spaced a second distance from said central pivot location, the two lift rollers subtending an acute angle at said central pivot location, said second distance being greater than said first distance; and positively rotating the lift arms in tandem from (1) a first position in which only the primary lift rollers contact the respective transfer bar with the latter in its bottom position, to (2) a second position in which both lift rollers contact the respective transfer bar with the latter in a position intermediate its bottom and top positions, thence to (3) a third position in which only the second lift rollers contact the respective transfer bar with the latter in its top position; said transfer bar being contacted only by the primary lift rollers as it rises from the bottom position to said intermediate position, and being contacted only by said secondary lift rollers as it rises from its intermediate position to its top position.

GENERAL DESCRIPTION OF THE DRAWINGS

One embodiment of this invention is illustrated in the accompanying drawings, in which:

FIG. 1 is an elevational view of a two-stage lift arm constructed in accordance with this invention; and FIG. 2 is a similar view, taken of a conventional prior art lift arm; and FIG. 3 is a schematic elevational view of a machining installation into which this invention is incorporated.

DETAILED DESCRIPTION OF THE DRAWINGS

Figure 2:
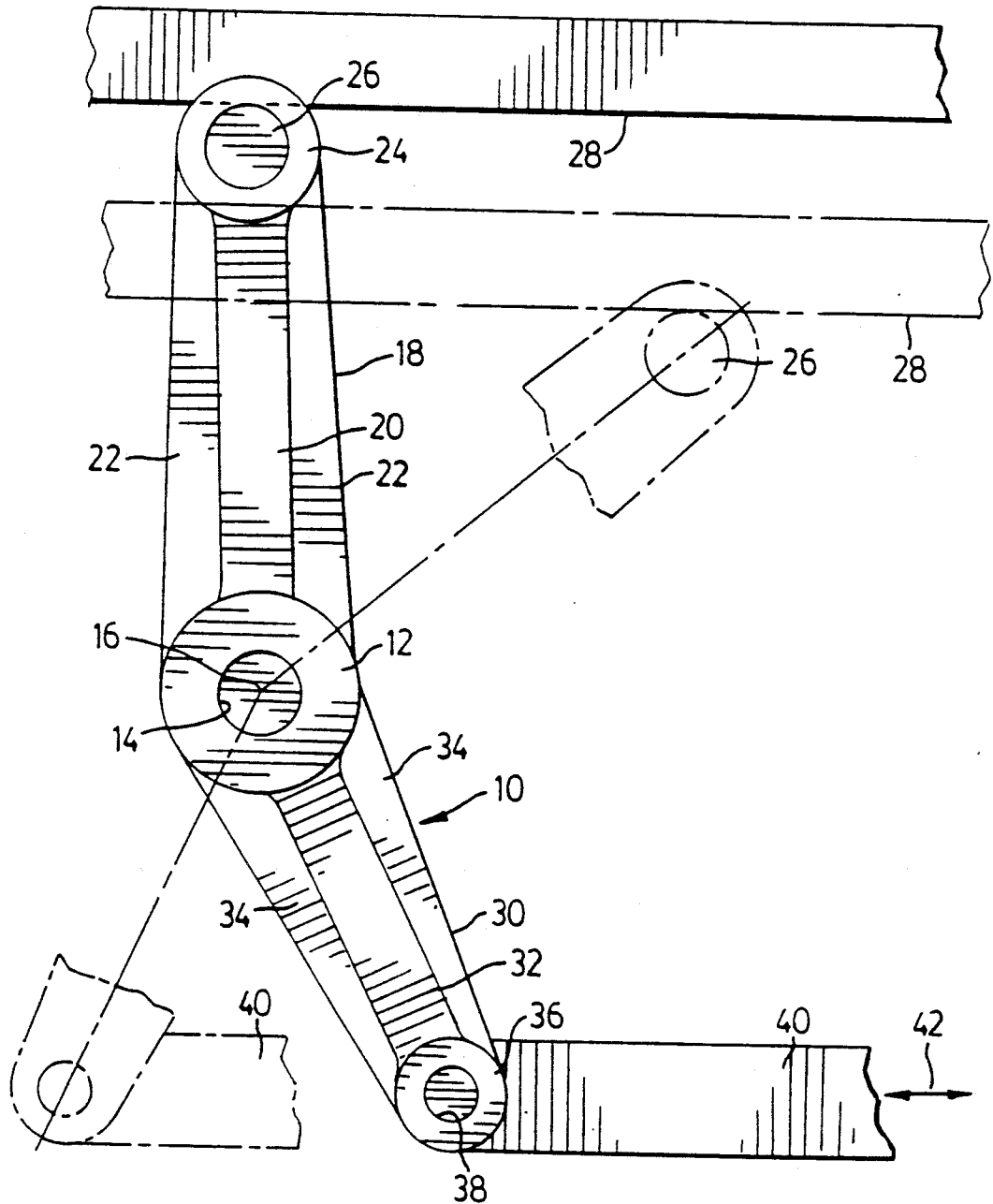

Attention is first directed to FIG. 2, which shows a single-stage lift arm 10 representative of the prior art. The lift arm 10 is formed as an integral unit having a central boss 12 defining a cylindrical bore 14. The axis 16 of the bore 14 constitutes a pivot location for the lift arm 10.

Extending upwardly from the boss 12 is a first arm 18 having a central thickened portion 20 and lateral flanges 22, and terminating in a further boss 24 supporting a roller 26 adapted to contact the underside of a transfer bar, the underside being represented by the line 28.

Extending generally in the opposite direction from the first arm 18 is a second arm 30. As can be seen, the two arms 18 and 30 define a wide, obtuse angle between them. Like the first arm 18, the second arm 30 also has a central thickened portion 32 and lateral flanges 34. At its extremity, the second arm 30 has a boss 36 defining a central bore 38 to facilitate attachment of a drag link of which one is partly shown at 40 in FIG. 2. The two-headed arrow 42 refers to the axial motion of the drag link 40.

The prior art lift arm 10 shown in FIG. 2 is illustrated in solid lines in its position corresponding to the maximum lift for the transfer bar which it supports. By rotating the lift arm 10 of FIG. 2 in the clockwise direction through an angle of approximately 52°, the transfer bar is allowed to descend through the desired distance. In FIG. 2, the bottom surface of the transfer bar is shown in its lowest position in broken lines, resting against the roller 26 which has now shifted rightwardly and downwardly due to the rotation of the lift arm 10. The extremities of the lift arm shown in broken lines in FIG. 2 represent the position corresponding to the lowest position of the transfer bar.

Thus, the lift arm 10 swings to its furthest counterclockwise position (shown in solid lines in FIG. 2) to place the transfer bar in its highest location, and swings to its furthest clockwise position (shown in broken lines in FIG. 2) to allow the transfer bar to descend to its lowermost position.

It will be understood that, in the normal construction of the apparatus to which this invention relates, there would be provided two transfer bars, and each transfer bar would be raised and lowered by a plurality of lift arms of the kind shown in FIG. 2. Typically, a single drag link 40 would be connected to all of the lift arms under each transfer bar, so that movement of the drag link would shift all of the lift arms in tandem.

Figure 1:
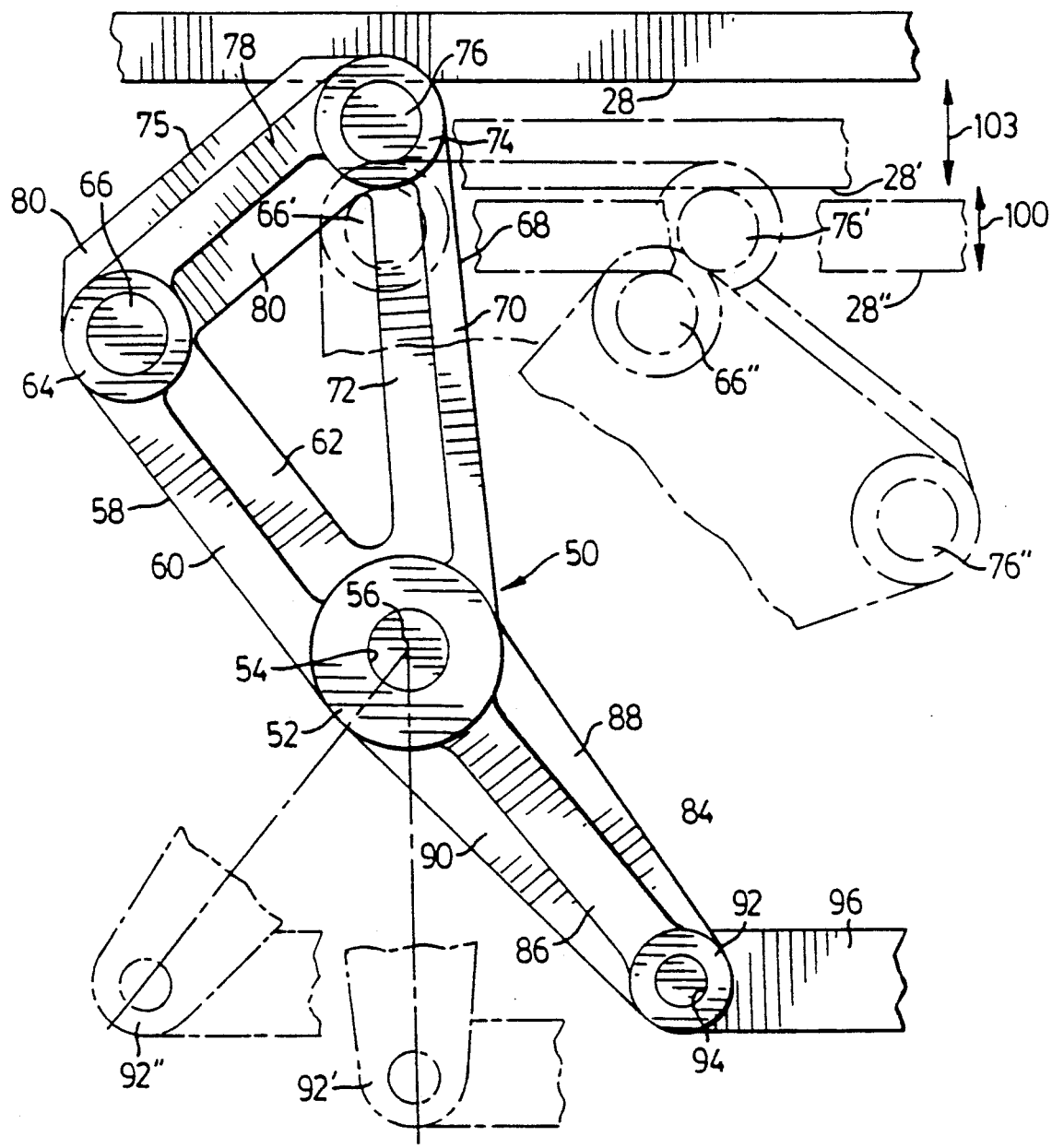

Attention is now directed to FIG. 1 which illustrates a modified lift arm which is the object of the present invention. In FIG. 1, the lift arm 50 has a central boss 52 similar to that shown at 12 in FIG. 2, and the boss 52 defines a central bore 54, the central axis 56 of which defines a horizontal pivot axis for the lift arm 50. It will thus be understood that the lift arm 50 is adapted to rotate in a vertical plane which is perpendicular to the horizontal axis 56.

Extending from the boss 52 is a first arm 58 which includes a thickened portion 60 and a flange 62, and which defines at its end remote from the boss 52 a further boss 64 to which is mounted a roller 66 adapted to contact the underside of a transfer bar, in the same manner as the roller 26 in FIG. 2 contacts the underside of a transfer bar.

Also extending from the boss 52 is a second arm 68 having a thickened portion 70 and a flange 72, and similarly defining a boss 74 supporting a roller 76 which is adapted to contact the underside of a transfer bar.

Extending between the bosses 64 and 74 is an integral crosslink 75 having a central thickened portion 78, and two laterally extending flanges 80.

It will thus be seen that the lift arm 50 defines and incorporates an integral triangular structure having the bosses 54, 64 and 74 at its vertices. Likewise, the triangular structure has the roller 66 at one vertex, the roller 76 at another vertex and the pivot axis 56 at a third vertex.

In the solid-line drawing of the lift arm 50 in FIG. 1, there is shown a bracket 84 extending downwardly and rightwardly. The bracket includes a central thickened portion 86, and two laterally extending flanges 88 and 90. At its extremity remote from the boss 52, the bracket 84 defines a further boss 92 having an open central bore 94 which can be connected to a drag link 96 in a manner similar to that described above in connection with FIG. 2.

In FIG. 1, the numeral 28 designates the underside of the transfer bar in its uppermost position, the surface 28 lying against and supported by the roller 76. By rotating the lift arm 50 in the clockwise direction through approximately 39°, the roller 76 arrives at the position identified as 76', and simultaneously the roller 66 arrives at the position shown by the numeral 66'. The positions 66' and 76' are shown in broken lines and only in part, in order to avoid cluttering the drawing. The position of the boss 92 corresponding to the positions 66' and 76' is identified as 92'.

It will be noted that the positions for the rollers shown at 66' and 76' are such that both of these rollers contact the lower surface (28') of the transfer bar simultaneously. It is also easy to visualize that, as the lift arm moves from the solid line position of FIG. 2 to the intermediate position identified by 66', 76' and 92', only the roller 76 is in contact with the underside 28 of the transfer bar. When the intermediate position is reached, and only in that position, both of the rollers contact the underside 28' simultaneously.

Further rotation of the lift arm 50 in the clockwise direction shown in FIG. 1 will bring the lift arm to the position for which the rollers are designated as 66" and 76". In this position, the transfer bar is at its lowermost location, and its underside 28" rests upon and is supported only by the roller 66". Also, during the movement from 66' to 66", only the roller 66 is in contact with the transfer bar.

In the lower portion of FIG. 1, the position of the boss 92 for the furthest clockwise position of the lift arm 50 is identified as 92".

It will now be clear that, in order to provide a two-stage lift, the first arm 58 must be shorter than the second arm 68, so that the distance from the roller 66 to the pivot axis 56 is less than the distance from the roller 76 to the pivot axis 56. Imagine now that the lift arm is rotating from the first clockwise position (66" and 76") to the solid line position in FIG. 1, in order to understand what happens to the transfer bar. As the roller 66 moves from the position 66" to the position 66', there occurs a primary lift identified by the two-headed arrow 100. During this time, only the roller 66 is in contact with the transfer bar at the undersurface 28" thereof.

When the lift arm 50 reaches the position identified by rollers 66' and 76' in FIG. 1, both of these rollers are in contact with the undersurface 28, of the transfer bar. Further counterclockwise rotation of the lift arm 50 will shift the weight of the transfer bar from roller 66' to roller 76', and the latter will continue to carry this weight as it moves up to the position shown at 76 (solid lines) in FIG. 1. This corresponds with a secondary lift shown by the two-headed arrow 103 in FIG. 1. The total lift for the transfer bar is thus the sum of the lifts 100 and 103.

It is important to note that, at the intermediate stage represented by the rollers 66' and 76', the roller 66' has moved just past top dead center with respect to the axis 56. In other words a line joining the axis 56 with the center of the roller 66, extends upwardly and slightly leftwardly with respect to the vertical. In the drawing, the angulation of this line with respect to the vertical is approximately two degrees, although this value is not considered to be limiting with respect to the invention. The significance of the fact that the roller 66' is slightly past top dead center with respect to the axis 56 is that, in the event that the hydraulic or power system of the assembly fails during the secondary lift (arrow 103), the transfer bar will descend only to the intermediate position, since the lift arm 50 is stable in this position (with both rollers 66' and 76' in contact with the transfer bar).

In a similar manner, the more distant roller 76 also takes up a position which is slightly past top dead center (in the counterclockwise direction) for the third position of the lift arm 50 (that corresponding to the top position for the transfer bar). This is a stable position. Again the distance past top dead center can be approximately two degrees, but this value is not limiting in terms of the invention. A suitable stop mechanism provided for the various lift arms, or provided by the mounting of the connecting link 96, could be arranged to establish the furthest clockwise position of the lift arm 50 (solid lines), i.e. that in which the roller 76 is slightly past top dead center in the counterclockwise direction.

It will be noted in FIG. 1 that the center of the boss 92 and the center of the boss 64 are approximately equidistant from the axis 56, however this is not considered to be a limitation of the invention.

Further values for distances and angles will now be given for a typical prototype lift arm in accordance with this invention, although none of these values is regarded as limiting the broad aspect of this invention.

For the lift arm 50 illustrated in FIG. 1, the axial centers of the two rollers 66 and 76 subtend an angle of approximately 39° at the axis 56. The center of the roller 66, the axis 56 and the center of the bore 94 all lie on the same rectilinear line, with the center of the roller 66 being spaced 15.65 inches from the axis 56, and the center of the bore 94 being spaced 15.49 inches from the axis 56. The center of the roller 76 is spaced 19.51 inches from the axis 56.

Using these example dimensions, the maximum force required to be exerted in the horizontal direction by the link 96, when the roller 66 is in the position identified as 66", is 0.782 of the total vertical load on the roller.

With the dimensions given, the primary lift is approximately 3.14 inches, whereas the secondary lift is approximately 3.86 inches, giving a total lift of 7.00 inches.

Attention is now directed to FIG. 3, which shows, in somewhat schematic form, a portion of an apparatus with which this invention is useful. In FIG. 3, a supporting surface 130 supports a plurality of bases 132 which in turn support fixtures 134 of which one or more may be idle for a given operational procedure. The work fixtures are adapted to support workpieces 136 which are adapted to be moved from one fixture to the next on a pair of transfer bars 138 (of which only one is visible in FIG. 3). The arrangement shown in FIG. 3 includes a plurality of lift arms 50 identical to that shown in FIG. 1. In order to avoid cluttering the drawing of FIG. 3, the individual parts of the lift arms 50 have not been identified by numerals. The positions of the lift arms 50 shown in solid lines in FIG. 3 represent the raised position of the transfer bar 138. At far left and far right of FIG. 3, there is broken-line representation of a lift arm 50 corresponding to the lowest position of the transfer bar. The transfer bar itself is shown, in its lowest position, in broken lines at the numeral 138a.

At the right in FIG. 3 there is provided an actuator cylinder 142, which moves the drag link 92 to which the lower ends of the lift arms 50 are attached. This arrangement permits all of the lift arms 50 to move together in tandem.

In FIG. 3, the arrow 145 designates the transfer direction for the workpieces 136.

In the appended claims, reference to a workpiece to be machined is to be understood to include a workpiece by itself sliding on the transfer bars, or a workpiece which is secured to a pallet with the pallet sliding on the transfer bars.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. For use in a multi-station machining assembly in which a workpiece to be machined is transported on at least one transfer bar from one station to another, wherein said at least one transfer bar must be raised to a top position for transportation of the workpiece and lowered to a bottom position when the workpiece reaches a station, the improvement which comprises:
   a plurality of two-stage lift arms mounted to raise and lower said at least one transfer bar, each lift arm having a central pivot location at which it is mounted for rotation in a vertical plane about a horizontal axis, a primary lift roller spaced a first distance from said central pivot location, a secondary lift roller spaced a second distance from said central pivot location, the two lift rollers subtending an acute angle at said central pivot location, said second distance being greater than said first distance; and means for positively rotating the lift arms in tandem between (1) a first position in which only the primary lift rollers contact the respective transfer bar with the latter in its bottom position, (2) a second position in which both lift rollers contact the respective transfer bar with the latter in a position intermediate its bottom and top positions, and (3) a third position in which only the second lift rollers contact the respective transfer bar with the latter in its top position.

2. The improvement claimed in claim 1, in which said means for positively rotating the lift arms includes, on each lift arm a bracket supporting an attachment location, a hypothetical line from the pivot location to said attachment location extending generally away from the said rollers, and control link means attached to said lift arms at said attachment locations thereof, such that movement of the control link means causes movement of said lift arms between the said first, second and third positions.

3. The improvement claimed in claim 1, in which, when each lift arm is in its second position, the primary lift roller thereof has moved slightly past a top dead center position with respect to the central pivot location of that lift arm; and when each lift arm is in its third position, the secondary lift roller thereof has moved slightly past a top dead center position with respect to the central pivot location of that lift arm.

4. The improvement claimed in claim 1, in which, when each lift arm is in its second position, the primary lift roller thereof has moved substantially about 2 degrees past a top dead center position with respect to the central pivot location of that lift arm; and when each lift arm is in its third position, the secondary lift roller thereof has moved substantially about 2 degrees past a top dead center position with respect to the central pivot location of that lift arm.

5. The improvement claimed in claim 2, in which said pivot location is at an intermediate position on a hypothetical rectilinear line extending between the axis of said primary lift roller and said attachment location, the primary lift roller axis and the attachment location being substantially equidistant from said pivot location.

6. The improvement claimed in claim 5, in which said subtended acute angle is substantially about 39 degrees.

7. The improvement claimed in claim 1, in which each lift arm incorporates an integral triangular structure having the primary roller at one vertex, the secondary roller at another vertex, and the pivot location at the remaining vertex.

8. A multi-station machining assembly, comprising:
a plurality of work stations,
at least one transfer bar adapted to transfer between work stations a plurality of workpieces,
a plurality of two-stage lift arms mounted to raise and lower said at least one transfer bar between a top position for transportation of the workpieces and a bottom position allowing the workpieces to be secured for machining,
each lift arm having a central pivot location at which it is mounted for rotation in a vertical plane about a horizontal axis, a primary lift roller spaced a first distance from said central pivot location, a secondary lift roller spaced a second distance from said central pivot location, the two lift rollers subtending an acute angle at said central pivot location, said second distance being greater than said first distance; and means for positively rotating the lift arms in tandem between (1) a first position in which only the primary lift rollers contact the respective transfer bar with the latter in its bottom position, (2) a second position in which both lift rollers contact the respective transfer bar with the latter in a position intermediate its bottom and top positions, and (3) a third position in which only the second lift rollers contact the respective transfer bar with the latter in its top position.

9. The assembly claimed in claim 8, in which said means for positively rotating the lift arms includes, on each lift arm, a bracket supporting an attachment location, a hypothetical line from the pivot location to said attachment location extending generally away from the said rollers, and control link means attached to said lift arms at said attachment locations thereof, such that movement of the control link means causes movement of said lift arms between the said first, second and third positions, and power means for moving said control link means.

10. The improvement claimed in claim 8, in which, when each lift arm is in its second position, the primary lift roller thereof has moved slightly past a top dead center position with respect to the central pivot location of that lift arm; and when each lift arm is in its third position, the secondary lift roller thereof has moved slightly past a top dead center position with respect to the central pivot location of that lift arm.

11. The improvement claimed in claim 8, in which when each lift arm is in its second position, the primary lift roller thereof has moved substantially about 2 degrees past a top dead center position with respect to the central pivot location of that lift arm; and when each lift arm is in its third position, the secondary lift roller thereof has moved substantially about 2 degrees past a top dead center position with respect to the central pivot location of that lift arm.

12. The improvement claimed in claim 9, in which said pivot location is at an intermediate position on a hypothetical rectilinear line extending between the axis of said primary lift roller and said attachment location, the primary lift roller axis and the attachment location being substantially equidistant from said pivot location.

13. The improvement claimed in claim 12, in which said subtended acute angle is substantially about 39 degrees.

14. The improvement claimed in claim 8, in which each lift arm incorporates an integral triangular structure having the primary roller at one vertex, the secondary roller at another vertex, and the pivot location at the remaining vertex.

15. In a multi-station machining process in which a workpiece to be machined is transported on at least one transfer bar from one station to another, wherein said at least one transfer bar is raised to a top position for transportation of the workpiece and lowered to a bottom position when the workpiece reaches a station, a method of raising said at least one transfer bar from the bottom to the top position, the method comprising:
providing a plurality of two-stage lift arms mounted to raise and lower said at least one transfer bar, each lift arm comprising a central pivot location at which it is mounted for rotation in a vertical plane about a horizontal axis, a primary lift roller spaced a first distance form said central pivot location, a secondary lift roller spaced a second distance from said central pivot location, the two lift rollers subtending an acute angle at said central pivot location, said second distance being greater than said first distance; and positively rotating the lift arms in tandem from (1) a first position in which only the primary lift rollers contact the respective transfer bar with the latter in its bottom position, to (2) a second position in which both lift rollers contact the respective transfer bar with the latter in a position intermediate its bottom and top positions, thence to (3) a third position in which only the second lift rollers contact the respective transfer bar with the latter in its top position; said transfer bar being contacted only by the primary lift rollers as it rises from the bottom position to said intermediate position, and being contacted only by said secondary lift rollers as it rises from its intermediate position to its top position.

16. The method claimed in claim 15, in which the positive rotation of the lift arms is carried out by using at least one connecting link to exert a force on each lift arm at a location generally opposite the position of the respective primary lift roller with respect to the respective pivot location.

17. The improvement claimed in claim 15, in which, when each lift arm has reached its second position, the primary lift roller thereof has been moved slightly past a top dead center position with respect to the central pivot location of that lift arm; and when each lift arm has reached its third position, the secondary lift roller thereof has been moved slightly past a top dead center position with respect to the central pivot location of that lift arm.

18. The improvement claimed in claim 17, in which each lift roller is moved past the said top dead center position by substantially about two degrees.

* * * * *